(12) United States Patent
Oiwa et al.

(10) Patent No.: US 7,589,440 B2
(45) Date of Patent: Sep. 15, 2009

(54) STEPPING MOTOR

(75) Inventors: Shoji Oiwa, Kiryu (JP); Masafumi Sakamoto, Kiryu (JP); Toru Kobayashi, Kiryu (JP); Masahiko Azegami, Kiryu (JP); Yasuaki Motegi, Kiryu (JP); Takaya Kato, Kiryu (JP); Yasuo Matsuda, Kiryu (JP); Kazuo Onishi, Kiryu (JP); Naoyuki Kanamori, Kiryu (JP); Tadashi Fukushima, Kiryu (JP)

(73) Assignee: Nidec Servo Corporation, Kiryu-shi (JP)

( * ) Notice: Subject to any disclaimer, the term of this patent is extended or adjusted under 35 U.S.C. 154(b) by 220 days.

(21) Appl. No.: 11/562,692

(22) Filed: Nov. 22, 2006

(65) Prior Publication Data

US 2007/0120426 A1 May 31, 2007

(30) Foreign Application Priority Data

Nov. 25, 2005 (JP) ............................. 2005-341014
Feb. 24, 2006 (JP) ............................. 2006-048171

(51) Int. Cl.
*H02K 37/12* (2006.01)
(52) U.S. Cl. .................................................. 310/49 R
(58) Field of Classification Search ............... 310/49 R, 310/216, 156.01
See application file for complete search history.

(56) References Cited

U.S. PATENT DOCUMENTS 4,739,201 A * 4/1988 Brigham et al. ........... 310/49 R
6,369,479 B1 * 4/2002 Ochiai et al. ........... 310/156.51
6,633,105 B2 * 10/2003 Ohnishi et al. .............. 310/254
6,781,260 B2 8/2004 Sakamoto

FOREIGN PATENT DOCUMENTS

| JP | 52-59212 | 4/1977 |
| JP | 2000-197335 | 7/2000 |
| JP | 2005-6375 | 1/2005 |

OTHER PUBLICATIONS

U.S. Appl. No. 11/562,692, filed Nov. 22, 2006, Oiwa et al.
U.S. Appl. No. 11/677,886, filed Feb. 22, 2007, Sakamoto et al.

* cited by examiner

*Primary Examiner*—Nguyen N Hanh
(74) *Attorney, Agent, or Firm*—Oblon, Spivak, McClelland, Maier & Neustadt, L.L.P.

(57) ABSTRACT

A stepping motor includes: a stator having main magnetic poles each having small stator teeth on its tip, a core-back portion that connects outer portions of the poles, and windings wound around the poles; and two sets of rotor units that are arranged in an axial direction and face the stator with an air gap therebetween. Each rotor unit consists of two rotor cores that are separated in the axial direction and a magnet sandwiched thereby and magnetized in the axial direction. Each rotor core has small rotor teeth around its outer surface. The rotor cores of each rotor unit are deviated by ½ pitch of the small rotor teeth, and the two rotor units are arranged to make the magnetic polarities of the small rotor teeth of the adjacent two rotor cores identical. A magnet thickness Tm and a rotor core thickness Tc satisfy $0.25 \leq Tm/Tc \leq 0.45$.

3 Claims, 11 Drawing Sheets

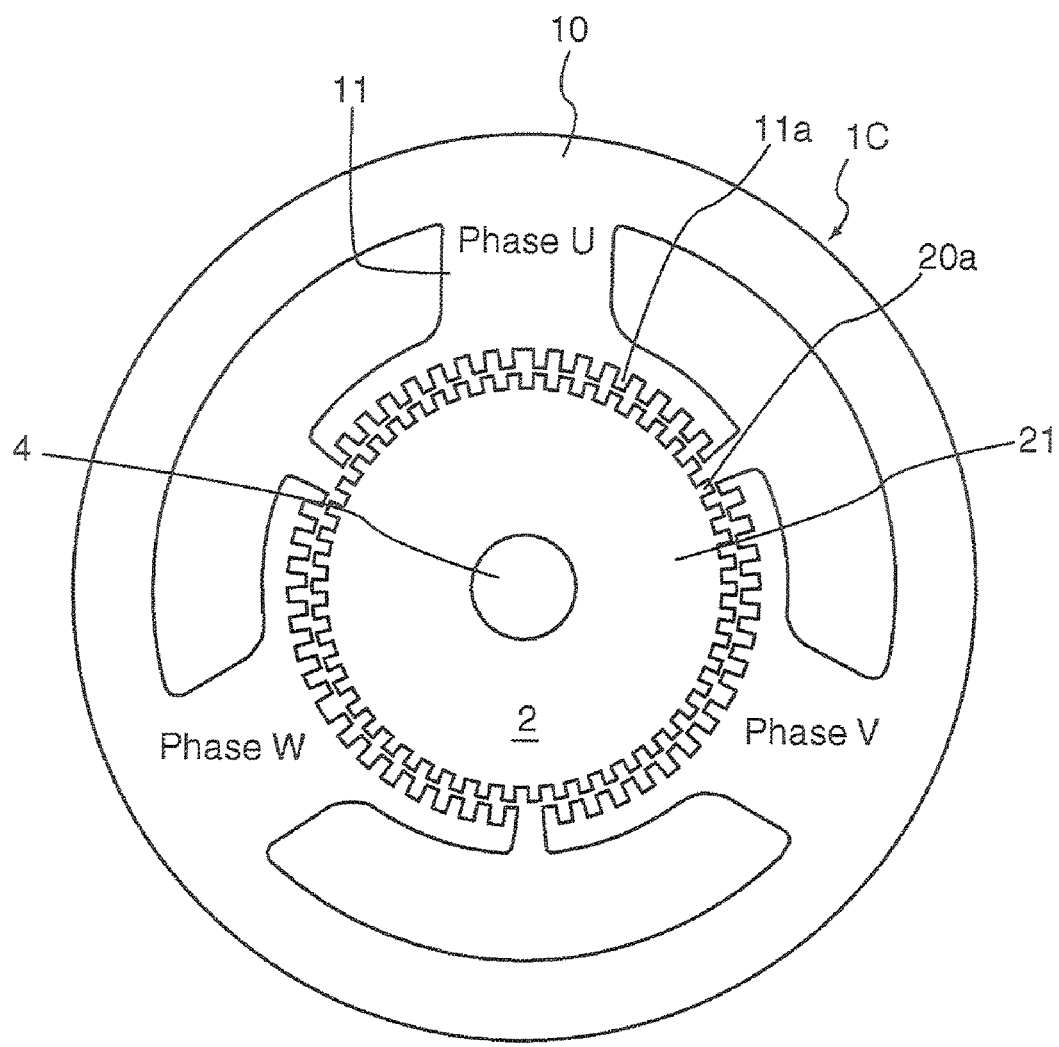

STEPPING MOTOR

BACKGROUND OF THE INVENTION

Figure 1:
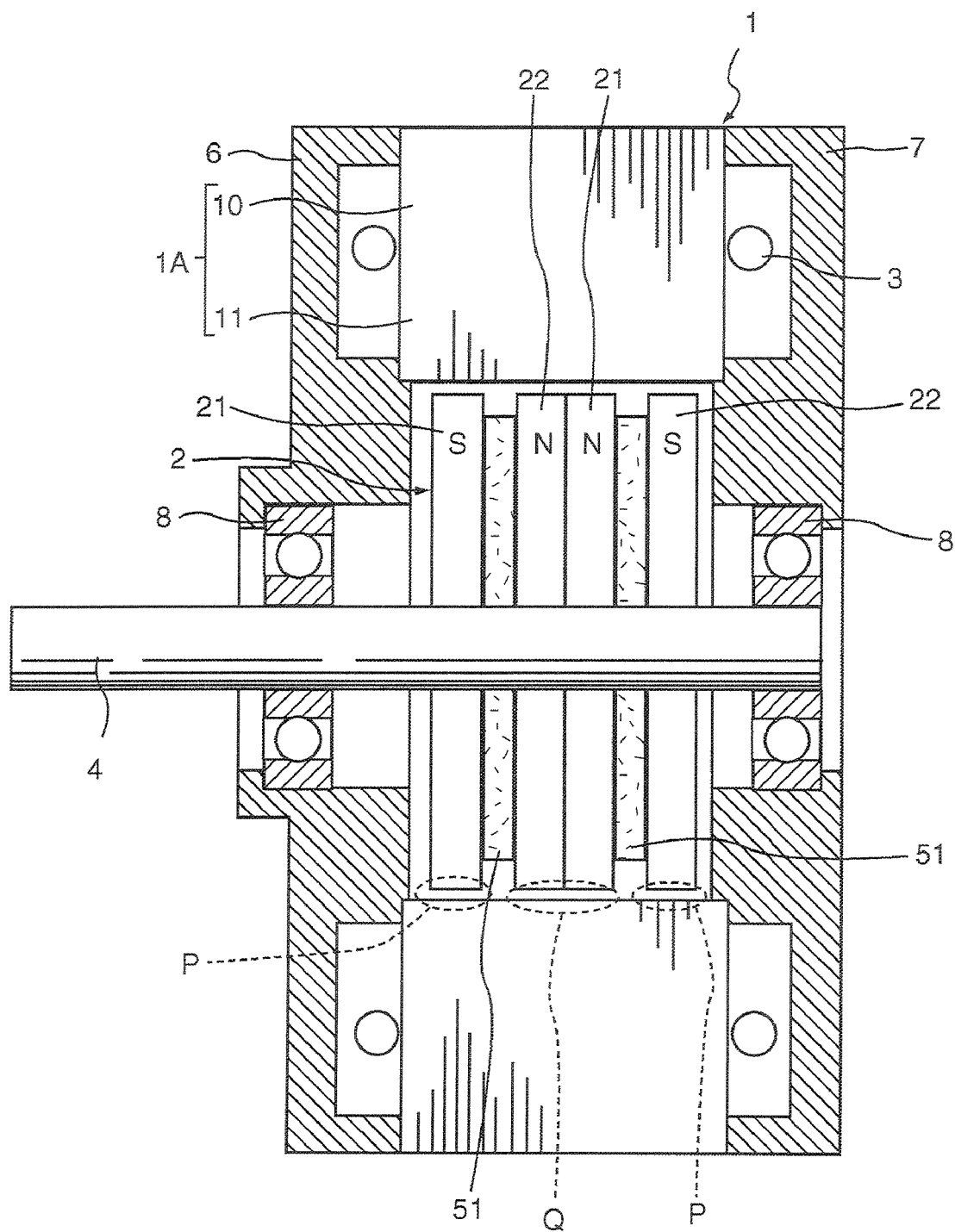

The present invention relates to a hybrid type stepping motor (hereafter referred to as a motor) used for OA equipment treating images, such as a facsimile, an ink-jet printer, a laser beam printer, or a copy machine.

A motor used for each above OA equipment is required to reduce vibration and noise with satisfying cost reduction as the absolute condition.

U.S. Pat. No. 6,781,260 discloses a stepping motor that has large torque with low vibration. The stepping motor disclosed in the publication is constructed by arranging a rotor having two sets of rotor units inside a stator on which windings are wound. Each of the rotor units consists of a ring-shaped unipolar magnet whose flat surfaces are magnetized and a pair of rotor cores that sandwich the magnet. Many rotor teeth are formed around each of the rotor cores. The two rotor units are attached to a motor shaft so that the magnets have opposite polarities to make the magnetic polarities of the rotor teeth of the adjacent two rotor cores identical. Since the stepping motor of the publication is provided with four rotor cores, radial attraction forces are distributed and balanced as compared with a conventional motor with two rotor cores. Therefore, an imbalance moment does not occur, which reduces vibration and noise owing to clearances of bearings or the like. That is, vibration and noise are lower than the conventional motor. This stepping motor generates double the torque of the conventional motor of the same physique theoretically.

Generally, in such a stepping motor, it is necessary to serialize products so that a user can select motor torque according to load conditions used. In many cases, motors that are identical in the radial size but are different in length in the axial direction are prepared in order to serialize motors with different output torques. It is known for the conventional common motor that the optimum magnetic flux density distribution exists in the magnetic circuit that is determined by a residual magnetic flux density Br of a magnet, and configurations of a rotor core and a stator core.

However, since the disclosed stepping motor in the U.S. Pat. No. 6,781,260 is the first of its type in which two sets of rotor units each of which has a ring-shaped unipolar magnet whose flat surfaces are magnetized are attached to the motor shaft so that the magnets have opposite polarities, the optimum magnetic flux density distribution has not been analyzed.

In the meantime, the Japanese unexamined utility-model publication No. 52-59212(1977-59212) discloses a stepping motor with 8-pole stator structure that uses a plurality of ferrite magnets with a small residual magnetic flux density.

However, this publication does not describe a magnetic circuit and it does not suggest how to obtain the optimum magnetic circuit.

On the other hand, most stepping motors are designed that an air gap between an outer circumference of the small rotor teeth and a tip of a stator main magnetic pole is 0.05 mm in order to keep their performance. Therefore, extremely high precision is required for the roundness of rotor and the coaxiality of a rotor outer surface with respect to the motor shaft. In the past, a rotor is formed by stacking and unifying stamped core plates and then polishing an outer surface of the small rotor teeth in order to keep the required roundness and coaxiality.

Similarly, since extremely high precision is required for the roundness of the inside surface of a stator, a finishing process called honing is applied. Such a process keeps the air gap of about 0.05 mm between the outer surface of the small rotor teeth and the inner surface of the stator.

If a polishing process of the outer surface of the small rotor teeth causes a burr, it may be removed and get into the air gap, which may lock the motor. Therefore, a process to prevent a burr on the outer surface of the rotor is executed before the polishing process of the outer surface of the small rotor teeth. For example, resin is applied to coat around the outer surface of the rotor to avoid dispersion of a burr. In such a case, the outer surface is polished after the resin cures. Alternatively, a shot blast process, a buff polishing, or a process using water pressure may be applied after polishing the outer surface of the rotor.

Thus, there are many factors to increase the cost in order to keep the air gap of about 0.05 mm between the outer surface of the small rotor teeth and the inner surface of the stator. The factors include the polishing process for the outer surface of the rotor, the honing process for the inner surface of the stator, the anti-burr surface treatment, etc.

So, Japanese unexamined patent publication No. 2005-6375(hereinafter, called JP2005-6375A) discloses a manufacturing method of a rotor by forming a core plate that has many small rotor teeth around its periphery through stamping with a punch press and stacking a plurality of core plates. In this method, the press process is divided into a first step to form small holes by following the inner surfaces of the small rotor teeth and a second step to stamp the plate by following the outer surfaces of the small rotor teeth. As a result of the two-step process, the edge surface of the small tooth does not deform, and thereby the polishing process for the outer surface of the rotor becomes unnecessary.

Although the technique of JP2005-6375A can omit the polishing process, it requires two-step press process, which also increases the manufacturing cost.

In a standard stepping motor with an air gap of 0.05 mm, an attraction force in a radial direction between a rotor and a stator becomes extremely large against a generating torque, and such an attraction force becomes a source of an exciting force of the motor.

Japanese unexamined patent publication No. 2000-197335 (hereinafter, called JP2000-197335A) suggests a specific arrangement of all pillars of magnetic pole and a specific arrangement of small rotor teeth in a circumferential direction as an improvement in vibration and noise of a motor with a rectangular stator.

However, the method of JP2000-197335A is not practical because shape and size of an applicable motor are limited.

Further, the stepping motor disclosed in the above-mentioned U.S. Pat. No. 6,781,260 discloses that an air gap between the outer surface of the small teeth of the rotor core and the inner surface of the tips of the stator main magnetic poles is about 0.05 mm in general. Therefore, the stepping motor of U.S. Pat. No. 6,781,260 also requires the surface treatment to keep high accuracy in roundness of a rotor core and a stator.

SUMMARY OF THE INVENTION

A first object of the present invention is to provide a new indicator as an optimal design parameter of a stepping motor in order to implement optimum magnetic flux density distribution based on the motor structure disclosed in U.S. Pat. No. 6,781,260.

A second object of the present invention is to provide a high-torque and low-vibration stepping motor that does not requires polishing process etc. to an outer surface of a rotor and a surface treatment to an inner surface of a stator, and does not increases the step number of a press process.

In order to achieve the first object, a stepping motor according to a first aspect of the present invention includes: a stator having a plurality of main magnetic poles each of which has a plurality of small stator teeth formed on a tip of a jutting section thereof, a core-back portion that connects outer portions of the main magnetic poles as a single piece, and a plurality of windings wound around the respective main magnetic poles; and two sets of rotor units that are arranged in an axial direction and face the stator with an air gap therebetween, wherein each rotor unit consists of two rotor cores that are separated in the axial direction and a magnet that is sandwiched by the two rotor cores and magnetized in the axial direction, each of the rotor cores has a plurality of small rotor teeth around its outer surface, wherein the two rotor cores of each rotor unit are deviated by ½ pitch of the small rotor teeth in the circumferential direction, and the two rotor units are arranged to make the magnetic polarities of the small rotor teeth of the adjacent two rotor cores identical, and wherein the relationship between a magnet thickness Tm and a rotor core thickness Tc satisfies $0.25 \leq Tm/Tc \leq 0.45$.

Further, under the condition of the above-mentioned first aspect, the maximum magnetic flux density of the small rotor teeth in a radial direction component preferably falls within a range of 1.4 T to 1.7 T. Still further, the maximum differential magnetic flux density, which is the maximum difference between the magnetic flux density at both ends and that at a center of the stator main magnetic pole in the axial direction, preferably falls within a range of 0.75 T to 0.85 T.

A magnetic flux density, a flux linkage, a counter electromotive force, a torque, etc. are calculated using three-dimensional magnetic field analysis. The above-mentioned conditions have been determined by searching parameters that obtain the maximum torque using the calculation results. As a result, when the magnet thickness and the rotor core thickness are determined so that the relationship between the magnet thickness Tm and the rotor core thickness Tc satisfies $0.25 \leq Tm/Tc \leq 0.45$, the maximum magnetic flux density of the small rotor teeth falls within a range of 1.4 T to 1.7 T, and the maximum differential magnetic flux density between both ends and a center of the stator main magnetic pole in the axial direction falls within a range of 1.4 T to 1.7 T, the maximum counter electromotive force occurs.

The above-mentioned configuration can be applied to a two-phase motor having four or eight main magnetic poles and a three-phase motor having three or six main magnetic poles.

As a result, when a high-resolution HB type stepping motor is designed using the first aspect of the present invention, a relationship between a magnet thickness and a rotor core thickness can be optimized. Therefore, a stepping motor having the maximum counter electromotive force can be designed according to the total length of the motor. The residual magnetic flux density of a ring-shaped magnet may be less than 0.5 T. Therefore, a magnet with high cost/performance ratio such as a ferrite magnet can be efficiently used.

In order to achieve the second object, a stepping motor according to a second aspect of the present invention includes: a stator having a plurality of main magnetic poles each of which has a plurality of small stator teeth formed on a tip of a jutting section thereof, a core-back portion that connects outer portions of the main magnetic poles as a single piece, and a plurality of windings wound around the respective main magnetic poles; and two sets of rotor units that are arranged in an axial direction and face the stator with an air gap therebetween, wherein each rotor unit consists of two rotor cores that are separated in the axial direction and a magnet that is sandwiched by the two rotor cores and magnetized in the axial direction, each of the rotor cores has a plurality of small rotor teeth around its outer surface, wherein the two rotor cores of each rotor unit are deviated by ½ pitch of the small rotor teeth in the circumferential direction, and the two rotor units are arranged to make the magnetic polarities of the small rotor teeth of the adjacent two rotor cores identical, and wherein the air gap between the outer surface of the small rotor teeth and the inner surface of the stator main magnetic poles falls within a range of 0.06 mm to 0.08 mm.

With the above configuration, since the air gap becomes larger than 0.05 mm of the conventional stepping motor without reducing a torque, the required roundness is eased. Therefore, the polishing process for the rotor core and the stator, and the surface treatment such as removing burr become unnecessary, which can reduce the processing cost of a motor. Further, since a cogging torque in the rotating direction decreases as the air gap increases, vibration of motor can be reduced remarkably.

In the above-mentioned configuration, it is preferable that a ratio of a length L of the tip arc of the jutting section of the stator main magnetic pole to a width W of a winding mounting section satisfies $L/W < 2.9$, and an angle θ formed between the main magnetic pole and the jutting section satisfies 95 degrees $< θ < 120$ degrees.

When the above-mentioned conditions are satisfied, a displacement due to an attraction force in the radial direction applied to the small rotor teeth can be reduced, and the optimum size of the stator's jutting section to keep a winding space factor can be obtained. Therefore, a high-efficiency and low-vibration stepping motor can be provided.

DESCRIPTION OF THE ACCOMPANYING DRAWINGS

Figure 2A:
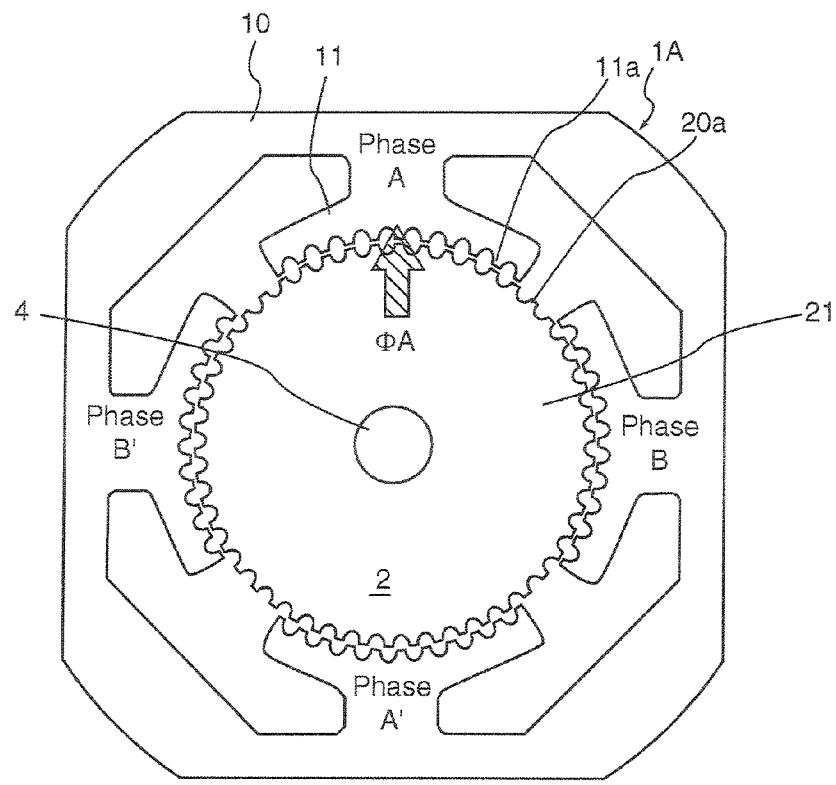
Figure 2B:
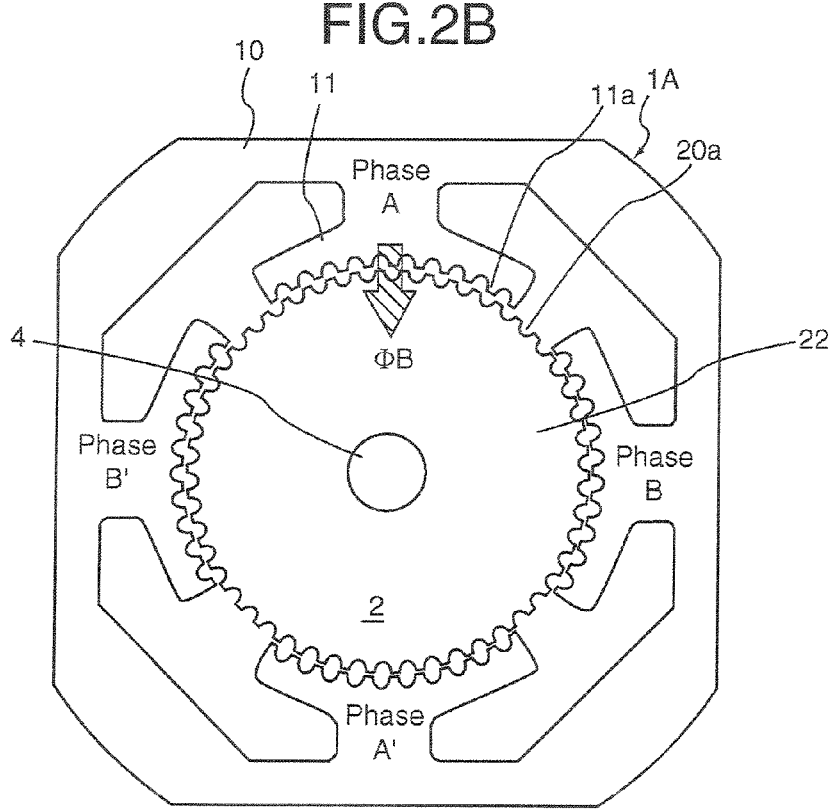
Figure 3:
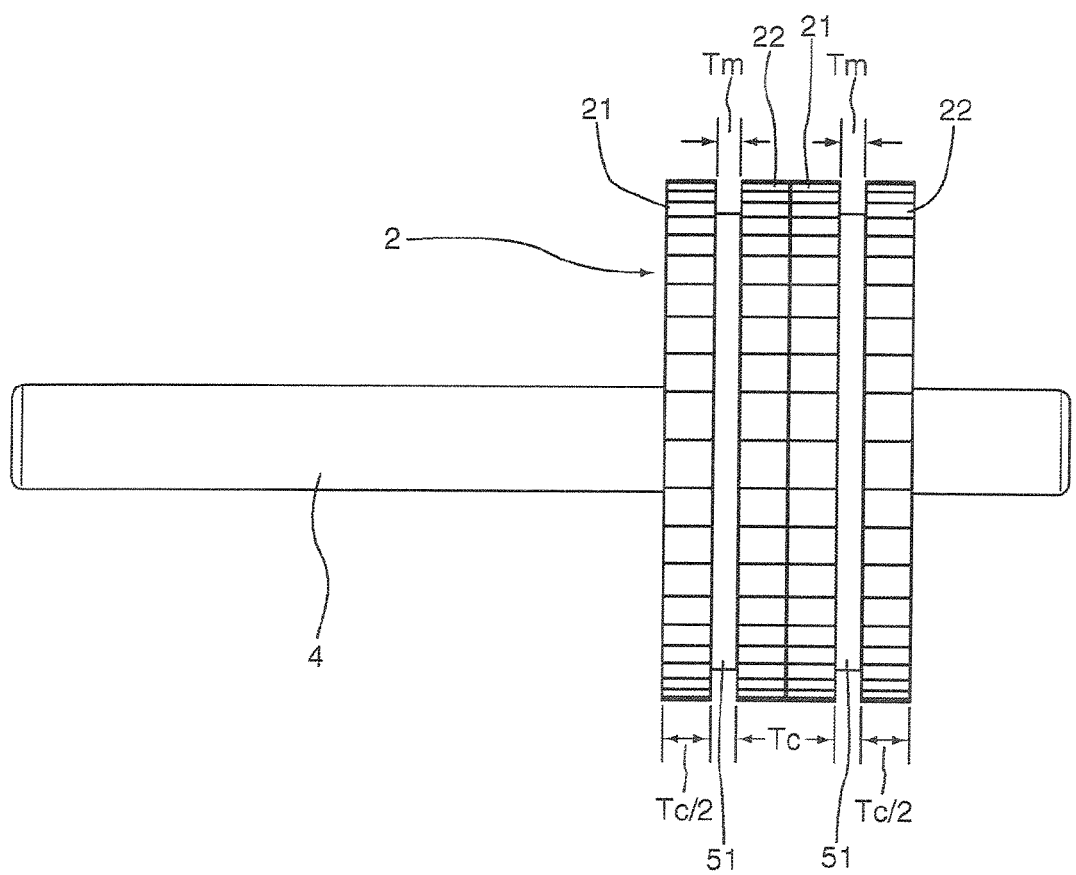
Figure 4:
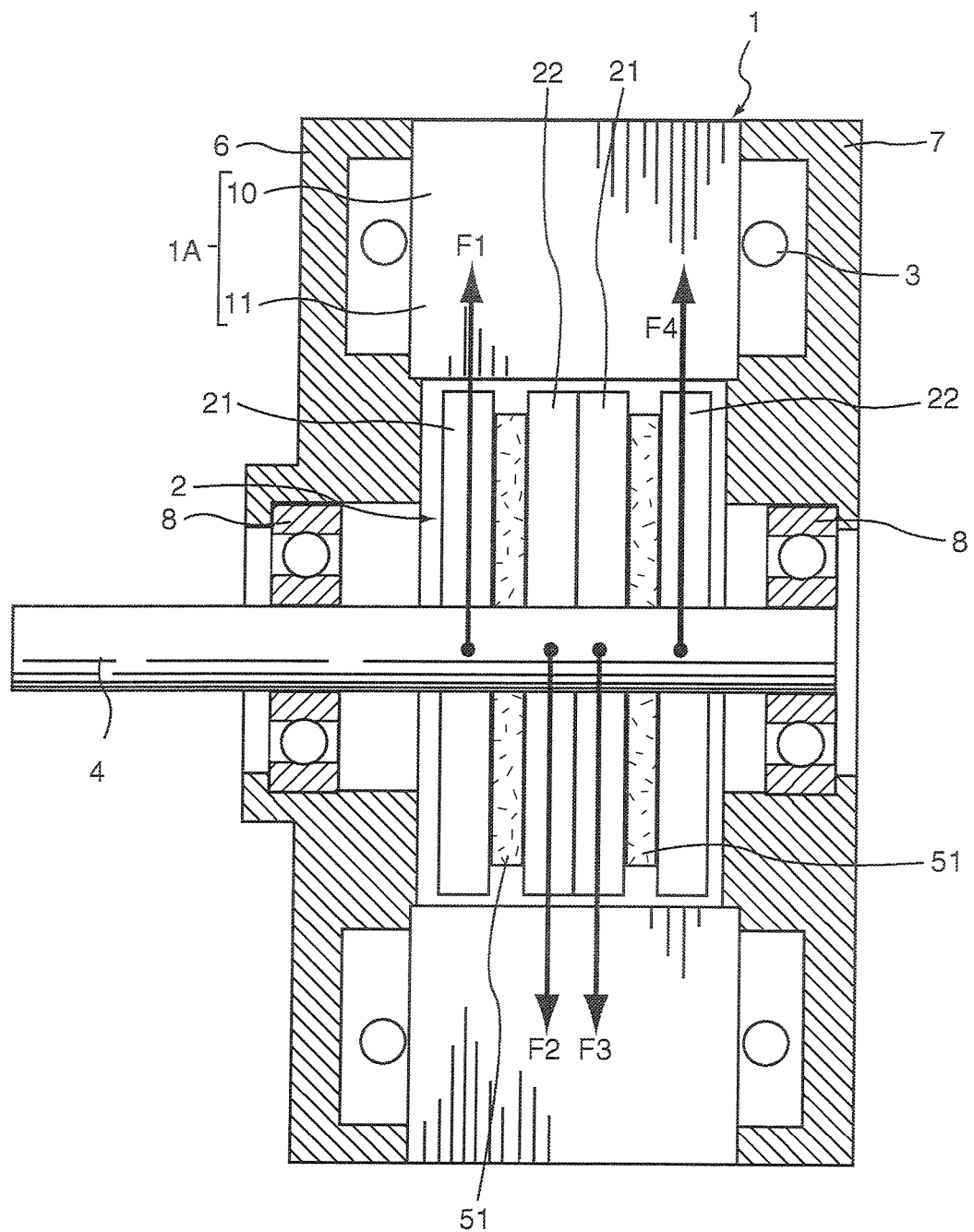
Figure 5:
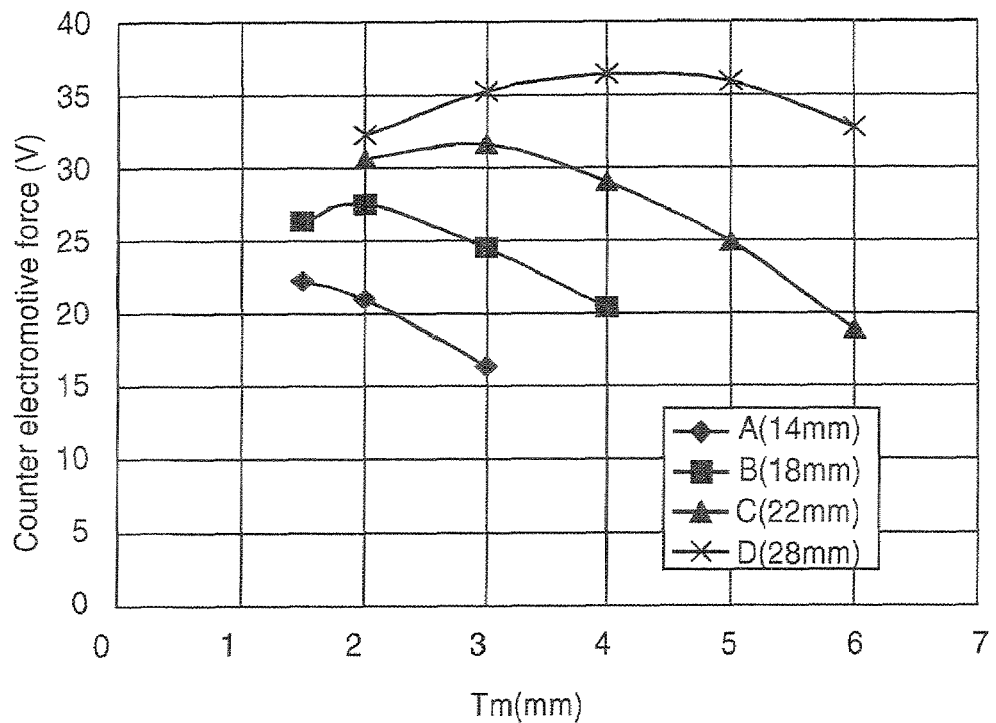
Figure 6:
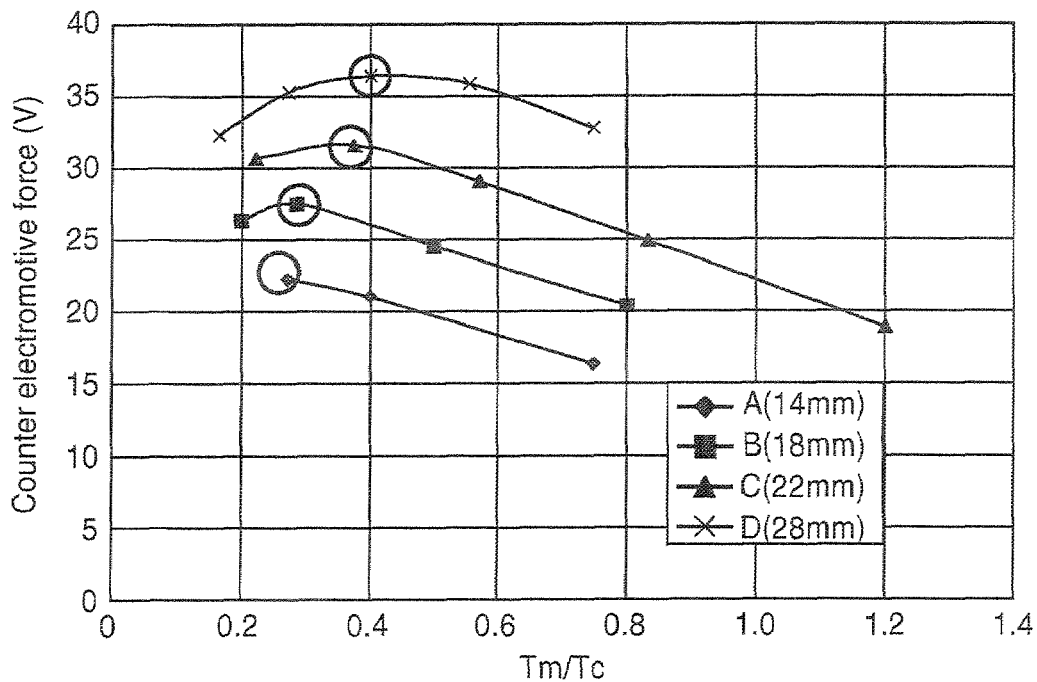
Figure 7:
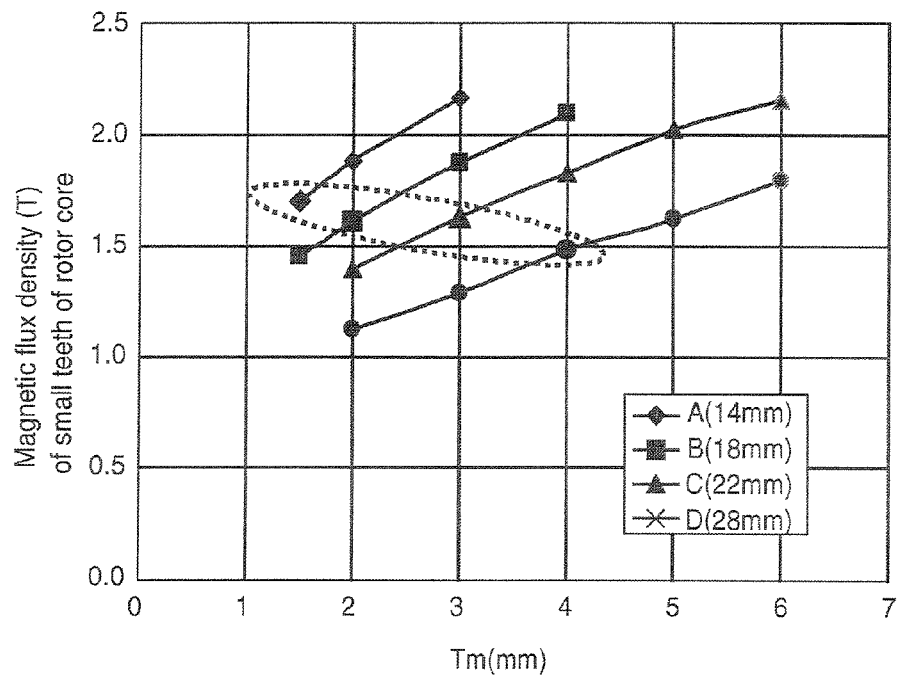
Figure 8:
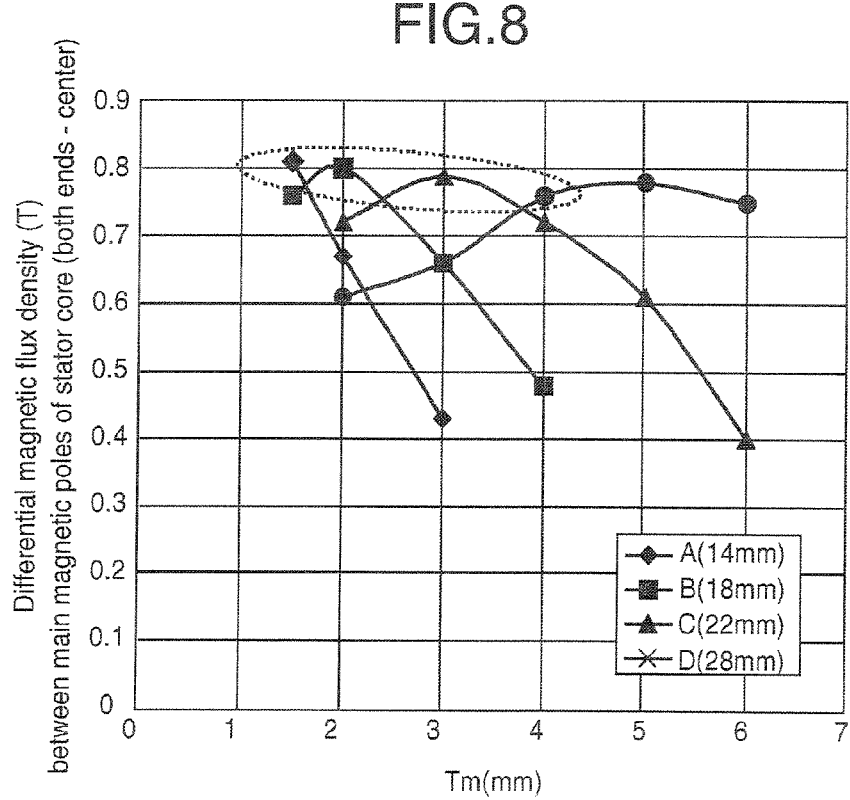
Figure 9:
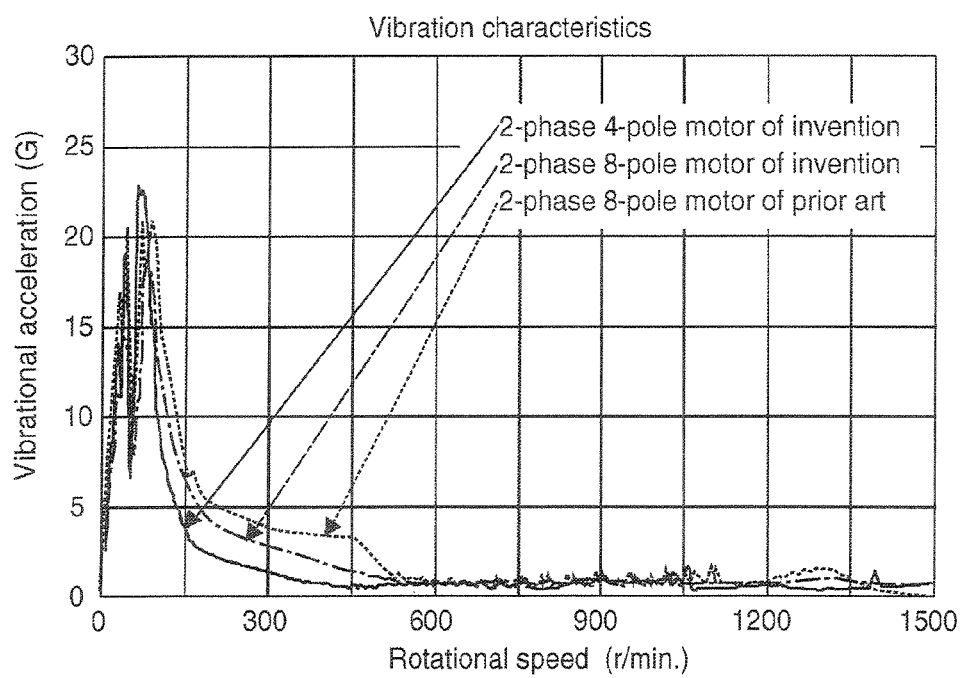
Figure 10:
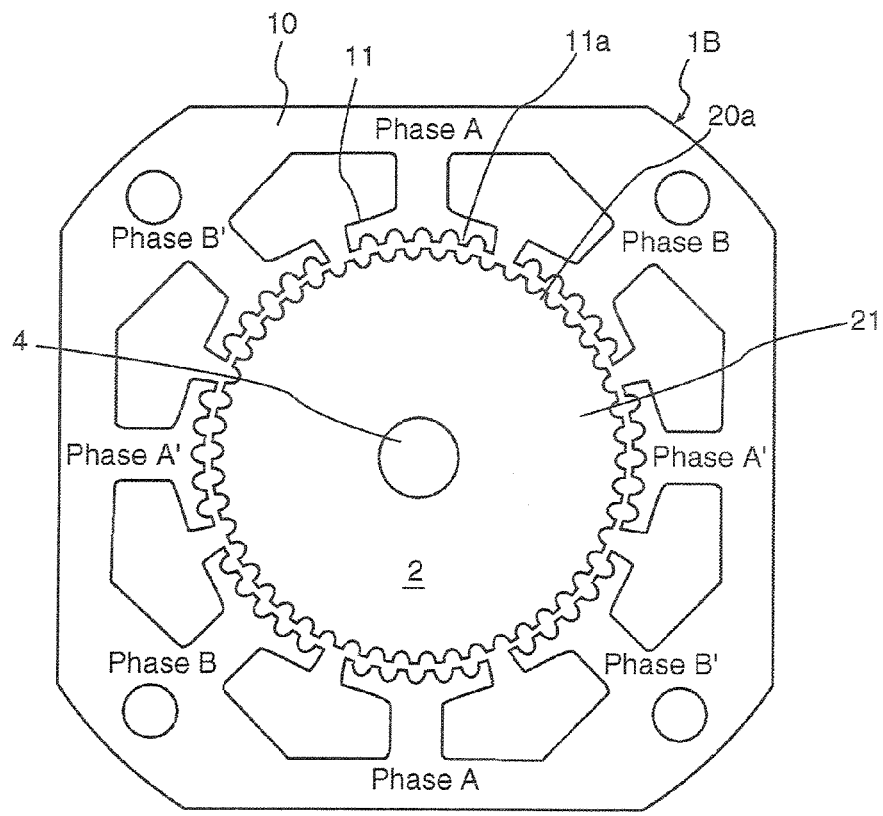
Figure 12A:
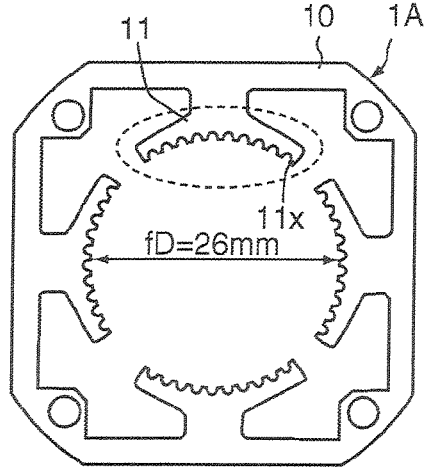
Figure 12B:
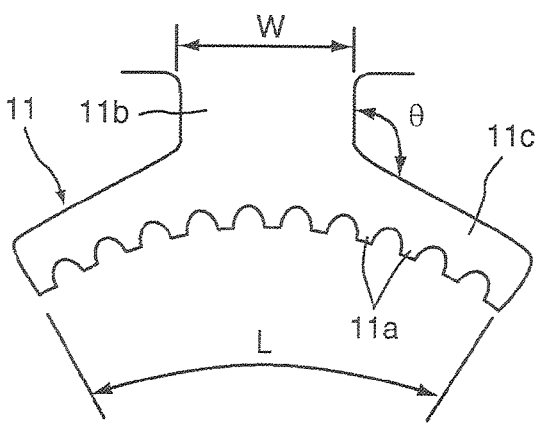
Figure 12C:
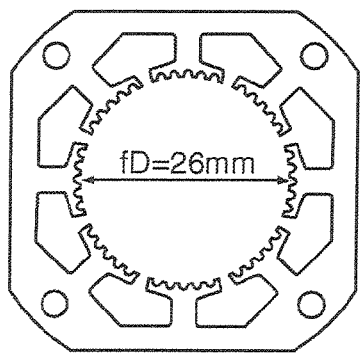
Figure 12D:
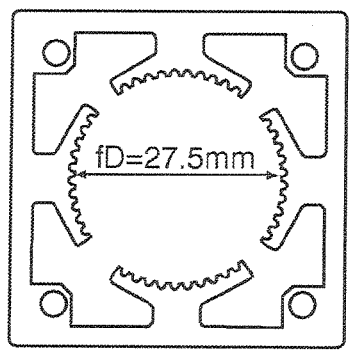
Figure 12E:
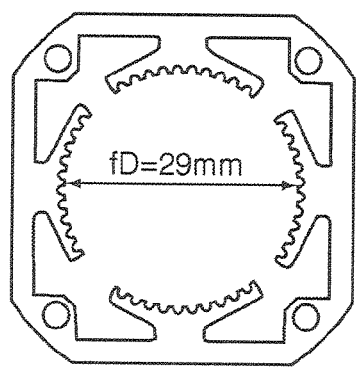
Figure 12F:
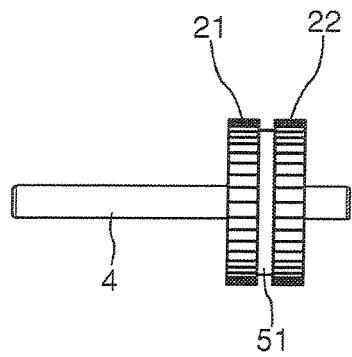
Figure 12G:
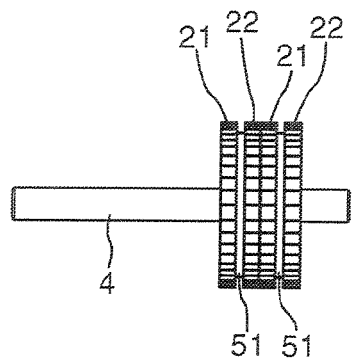
Figure 13:
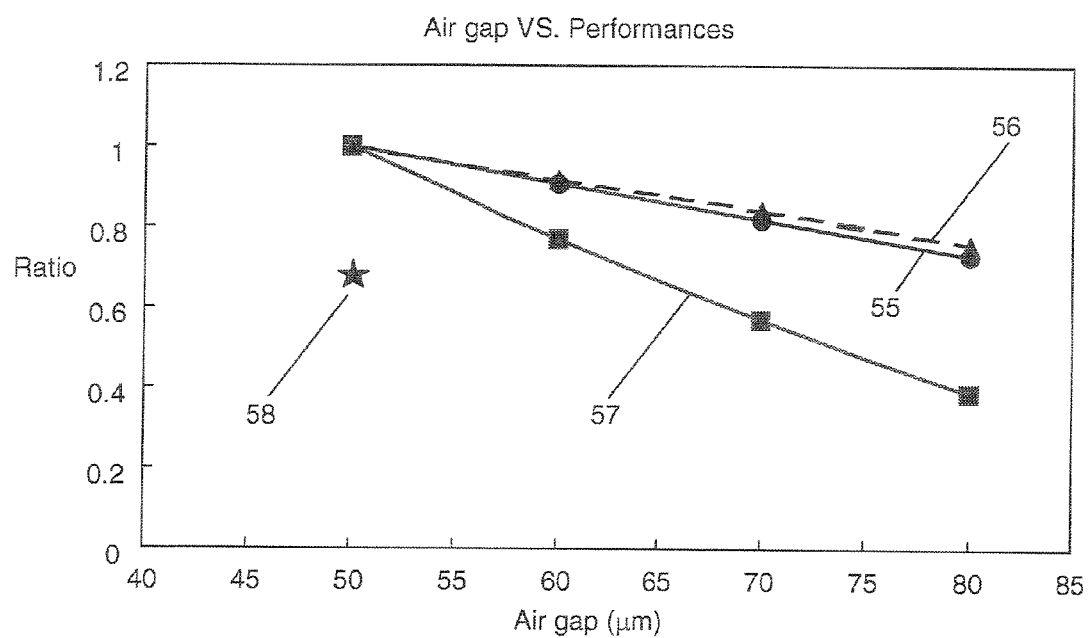
Figure 14:
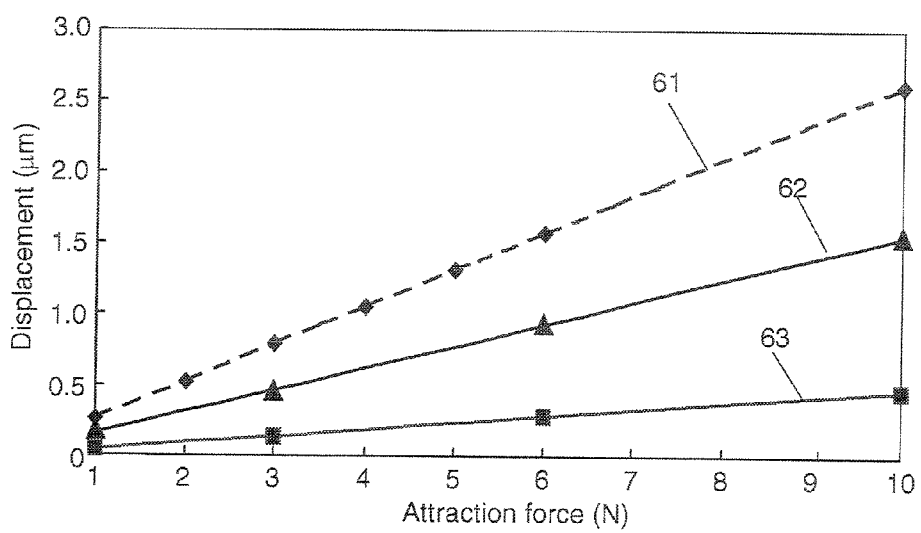
Figure 15:
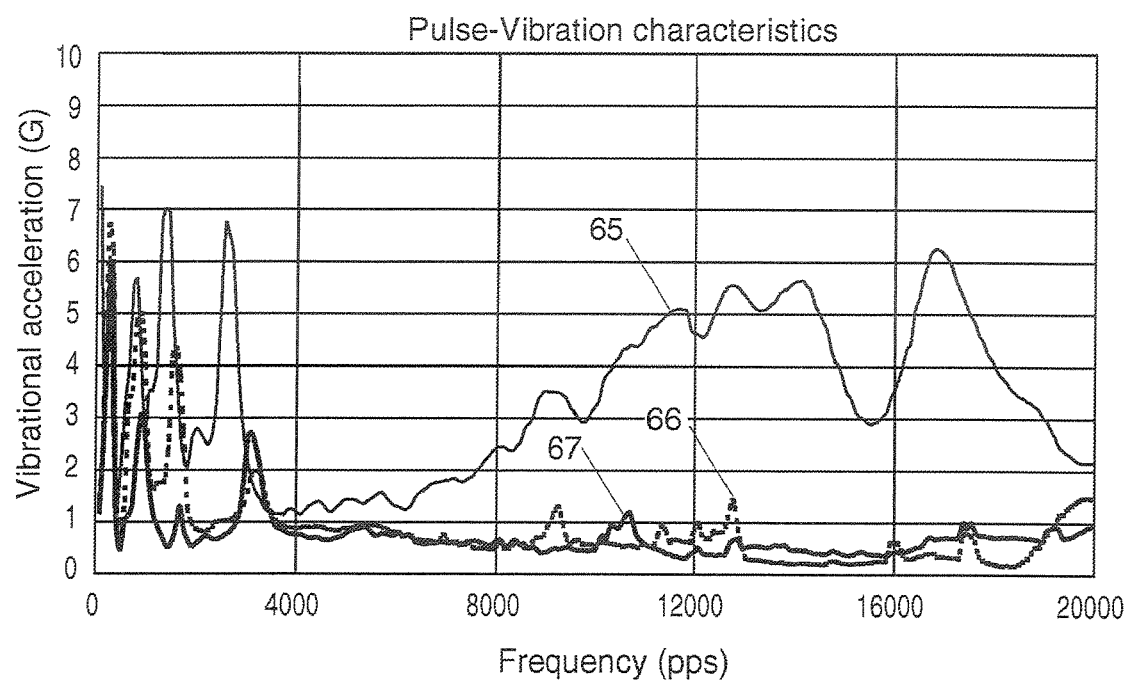

FIG. 1 is a longitudinal sectional view of a stepping motor of a first embodiment according to the present invention, FIGS. 2A and 2B are front views of the two-phase four-pole stepping motor of the first embodiment according to the present invention showing the relationship between a rotor core and a stator core, FIG. 3 is a side view of the rotor units of the stepping motor of the first embodiment according to the present invention, FIG. 4 is a longitudinal sectional view of the stepping motor of the present invention showing the radial forces, FIG. 5 is a graph showing characteristics of the stepping motor of the first embodiment according to the present invention, FIG. 6 is a graph showing characteristics of the stepping motor of the first embodiment according to the present invention, FIG. 7 is a graph showing characteristics of the stepping motor of the first embodiment according to the present invention, FIG. 8 is a graph showing characteristics of the stepping motor of the first embodiment according to the present invention, FIG. 9 is a graph showing vibration characteristics of the stepping motors of the first embodiment according to the present invention and the prior art, FIG. 10 is a front view of a two-phase eight-pole stepping motor as a variation of the first embodiment according to the present invention showing a relationship between a rotor core and a stator core, FIG. 11 is a front view of a three-phase three-pole stepping motor as a variation of the first embodiment according to the present invention showing a relationship between a rotor core and a stator core, FIGS. 12A-12G are front views of stator cores and side views of rotors of a second embodiment according to the present invention and a comparison example showing analysis conditions, FIG. 13 is a graph showing a relationship between an air gap and a performance of the second embodiment according to the present invention, FIG. 14 is a graph showing a displacement of small tooth of the stepping motor of the second embodiment according to the present invention, and FIG. 15 is a graph showing pulse-vibration characteristics of the stepping motor of the second embodiment according to the present invention.

DESCRIPTION OF THE EMBODIMENTS

Hereafter, stepping motors concerning embodiments of the present invention will be described with reference to the attached drawings. The basic structure of a stepping motor of each embodiment is identical to the structure disclosed in the aforementioned U.S. Pat. No. 6,781,260. The first embodiment supports the first aspect and the second embodiment supports the second aspect mentioned above.

First Embodiment

The first embodiment of the present invention is shown in FIG. 1 through FIG. 3. FIG. 1 is a longitudinal sectional view of the stepping motor, FIGS. 2A and 2B are front views of the motor insides viewed in an axial direction, and FIG. 3 is a side view of a rotor.

The stepping motor of the first embodiment is an inner rotor type HB type stepping motor constituted by arranging a HB type rotor 2 in a stator 1 that comprises magnetic substance of four-main-pole structure. As shown in FIG. 2A, the stator 1 include a stator core 1A as a main portion that consists of an annular core back portion 10 and four main magnetic poles 11 that are radially extended from the core back portion 10 toward inside. The main magnetic poles 11 functions as phase A, phase B, phase A', and phase B', respectively. A plurality of small stator teeth 11a are formed on the tip portion of each main magnetic pole 11 that faces the rotor 2. As shown in FIG. 1, windings 3 are wound around the main magnetic poles 11, respectively. The four windings are connected so that opposite pair of windings are magnetized in reverse polarities to form two-phase winding. Brackets 6 and 7, which are made from nonmagnetic substance such as aluminum, sandwich the stator core 1A from both sides in the axial direction, as shown in FIG. 1.

On the other hand, as shown in FIG. 1, the rotor 2 consists of two sets of rotor units that are adjacent to each other and are fixed to a rotation shaft 4. Each of the rotor units consists of a pair of rotor cores 21 and 22, and a magnet 51 that is sandwiched by the rotor cores. The magnet 51 is magnetized in the axial direction. The magnet 51 is arranged so that the polarity of the rotor core 22 of one rotor unit is identical to the polarity of the rotor core 21 of the other adjacent rotor unit.

As shown in FIGS. 2A and 2B, a plurality of small rotor teeth 20a are formed in even pitch on the circumference of rotor cores 21 and 22. FIG. 2A shows the rotor core 21, and FIG. 2B shows the rotor core 22. The two rotor cores 21 and 22 of the respective rotor units group are deviated by ½ pitch of the small rotor teeth in the circumferential direction. The phase of the small rotor teeth of the rotor core 22 of one rotor unit is identical to the phase of the small rotor teeth of the rotor core 21 of the other adjacent rotor unit.

The rotation shaft 4 to which the two sets of rotor units are fixed is rotatably supported by bearings 8 and 8 that are attached to insides of the brackets 6 and 7, respectively. This keeps an air gap between the small stator teeth 11a of the stator 1 and the small rotor teeth 20a of the rotor cores 21 and 22, which allows the rotor 2 to rotate together with the rotation shaft 4.

FIG. 3 is a side view of the rotor units of the first embodiment. A thickness each of two magnets 51 is Tm and a thickness of each of rotor cores 21 and 22 is Tc/2. A thickness of the center core is Tc because the rotor cores 21 and 22 overlap. The full length of the rotor units can be expressed as 2(Tc+Tm).

As shown in FIG. 3, in the stepping motor of the first embodiment, the thickness of the magnet 51 and the thickness of the rotor cores 21 and 22 are set so as to satisfy the following conditions;

(a) the relation of thickness Tm of the magnet 51 of the rotor 2 and the thickness Tc of the rotor cores 21 and 22 satisfies $0.25 \leq Tm/Tc \leq 0.45$, (b) the maximum magnetic flux density of the small rotor teeth falls within a range of 1.4 T to 1.7 T, and (c) the maximum differential magnetic flux density between both ends P and a center Q (see FIG. 1) of the stator main magnetic pole in the axial direction falls within a range of 0.75 T to 0.85 T.

This allows obtaining the maximum counter electromotive force.

The rotor core 22 of one rotor unit and the rotor core 21 of the other adjacent rotor unit do not necessarily contact with each other. A space may be kept therebetween or a magnetic insulator may be inserted therebetween.

FIG. 4 shows radial attraction forces F1, F2, F3, and F4 acting on the rotor cores 21, 22, 21, and 22 that are arranged in order, when the stepping motor of the first embodiment is magnetized by two-phase excitation. Since the radial attraction forces are distributed and balanced, there is no imbalance moment.

Conventionally, there is a method to increase stacking thickness of the stator core in order to increase motor torque. However, it is necessary to increase magnetic flux amount of a magnet to obtain a desired increased torque.

The flow of the magnetic flux in the two-phase four-pole stator of the first embodiment will be described with reference to FIG. 2A and FIG. 2B.

As shown in FIG. 2A, since the projections of the small rotor teeth 20a of the rotor core 21 face the projections of the small stator teeth 11a of the main magnetic pole 11 of the phase A, the magnetic resistance becomes small, which maximizes the magnetic flux passing through the phase A. On the other hand, since the projections of the small rotor teeth 20a of the rotor core 21 face the depressions of the small stator teeth of the main magnetic pole 11 of the phase A', the magnetic resistance becomes the largest, which minimizes the magnetic flux passing through the phase A'. The projections of the small rotor teeth 20a of the rotor core 21 overlap the projections of the small stator teeth 11a of the main magnetic poles of the phases B and B' by half. Therefore, the amount of magnetic flux passing through each of the phases B and B' is an intermediate value of the amounts of magnetic flux passing through the phases A and A'.

As shown in FIG. 2B, since the projections of the small rotor teeth 20a of the rotor core 22 face the depressions of the small stator teeth of the main magnetic pole 11 of the phase A, the magnetic resistance becomes the largest, which minimizes the magnetic flux passing through the phase A. On the other hand, since the projections of the small rotor teeth 20a of the rotor core 22 face the projections of the small stator teeth 11a of the main magnetic pole 11 of the phase A', the magnetic resistance becomes small, which maximizes the magnetic flux passing through the phase A'. The projections of the small rotor teeth 20a of the rotor core 21 overlap the projections of the small stator teeth 11a of the main magnetic poles of the phases B and B' by half. Therefore, the amount of magnetic flux passing through each of the phases B and B' is an intermediate value of the amounts of magnetic flux passing through the phases A and A'.

The magnetic flux amount of each phase increases as the magnetic flux amount of the magnet increases. However, if the magnetic flux amount of the magnet becomes too large, the amount of magnetic flux passing through the phase A becomes the largest for the rotor core 21 shown in FIG. 2A and the small teeth and the main magnetic pole of the phase A become saturated. As a result, the magnetic flux that cannot flow through the phase A returns back to the rotor core 22 shown in FIG. 2B as magnetic flux leakage via the combination of projections and depressions of the small rotor teeth 20a of the rotor core 22 and the small stator teeth 11a of the stator 1. Since the magnetic flux leakage $\Phi_B$ flows in the direction opposite to the regular winding flux linkage $\Phi_A$, the flux linkage is substantially weakened, which results in decreasing of the counter electromotive force of the phase A. That is, if the thickness of the magnet and the thickness of the rotor core are determined not to generate the magnetic flux leakage $\Phi_B$, the optimum relationship that maximizes the counter electromotive force can be found.

This phenomenon is common to HB type stepping motors of the same structure such as a two-phase eight-pole motor, a three-phase three-pole motor and a three-phase six-pole motor.

Next, generating torque is examined. In FIG. 2A, the effective main magnetic flux $\Phi_A$ flows into the winding of the phase A. Here, assuming that the rotor rotates at electrical angular velocity ω, the counter electromotive force $e_A$ is expressed as the following equation (1), where n is the number of turns of a winding of each phase, k is a constant, and $\Phi_A = \Phi \cos \theta$.

$$e_A = -n\frac{d\phi_A}{dt} = n\Phi k\omega\sin\theta \tag{1}$$

On the other hand, since torque is obtained by dividing a product of a counter electromotive force and an electric current by a mechanical angular velocity $\omega_M = \omega/p$, it is expressed as the following equation (2), where p is a pair number of poles, that is, the number of small teeth of the stator or the rotor.

$$T_A = e_A i/\omega_M = in\Phi kp \sin \theta \tag{2}$$

The equation (2) shows that the average magnetic flux Φ and the constant k must be larger in order to increase the torque based on premise that the number of turns of the winding and the number of the small teeth are constant.

That is, the combination of the magnet thickness and the rotor core thickness by which the product of the average magnetic flux Φ and the constant k maximizes obtains the largest torque and maximizes the counter electromotive force.

FIG. 5 shows variations of the counter electromotive forces of the stepping motors according to the first embodiment that are results of electromagnetic-field-analytical calculations by FEM (finite element method) using the magnet thickness Tm and the rotor core thickness Tc shown in FIG. 3 as parameters.

Four types of stepping motors A, B, C, and D whose total lengths of the rotor units are different are analyzed. The total length of the pair of rotor units in the motor A is 14 mm, that in the motor B is 18 mm, that in the motor C is 22 mm and that in the motor D is 28 mm. In each motor, the counter electromotive force is analyzed by changing the magnet thickness Tm. In FIG. 5, the horizontal axis represents the magnet thickness Tm, and the vertical axis represents the value of counter electromotive force of the phase A when the motor rotates at 500 r/min. FIG. 5 shows that each motor has a peak of the counter electromotive force at the specific thickness of the magnet.

Since the total length of the rotor units is fixed in each motor, the rotor core thickness decreases as the magnet thickness increases. An increase of the magnet thickness based on the arrangement of the rotor and stator as shown in FIGS. 2A and 2B, increases the magnetic flux of each phase. However, when the magnetic flux reaches a critical level of saturation of the small teeth and the main magnetic pole of the stator and the rotor, the magnetic flux that cannot flow through the phase A flows into the phases A', B, and B'. Since the magnetic flux that flows through the phase A' has an effect on the winding of the phase A to decrease the flux linkage, the counter electromotive force of the phase A results in decreasing.

As shown in FIG. 5, the optimum combination to maximize the counter electromotive force is "Tc=5.5 mm and Tm=1.5 mm" for the motor A whose total length of the rotor units is 14 mm. The optimum combination for the motor B whose total length of the rotor units is 18 mm is "Tc=7 mm and Tm=2 mm". The optimum combination for the motor C whose total length of the rotor units is 22 mm is "Tc=8 mm and Tm=3 mm". The optimum combination for the motor D whose total length of the rotor units is 28 mm is "Tc=10 mm and Tm=4 mm". This result has been checked by not only the electromagnetic field analysis but also the motors that are made as prototypes.

FIG. 6 is a graph showing a relationship between the counter electromotive force and the ratio Tm/Tc of the magnet thickness Tm and the rotor core thickness Tc based on the result obtained in FIG. 5. In FIG. 6, the horizontal axis represents the ratio Tm/Tc and the vertical axis represents the value of counter electromotive force. Assuming that the total length of the rotor unit falls within the range of 14 mm to 28 mm, the counter electromotive forces are maximized when the values of Tm/Tc fall within the range of 0.25 to 0.45.

FIG. 7 shows the magnetic flux density in the position where the counter electromotive force of the small rotor teeth 20a is maximized. In FIG. 7, the horizontal axis represents the magnet thickness Tm, and the vertical axis represents the magnetic flux density. When the relationship between the counter electromotive force and the magnet thickness Tm shown in FIG. 5 is plotted on the graph of FIG. 7, it becomes clear that the maximum magnetic flux density of the small rotor teeth is distributed in a range of 1.5 T to 2 T.

FIG. 8 is a graph whose horizontal axis represents the magnet thickness and the vertical axis represents the differential magnetic flux density of the main magnetic pole 11 of the stator. When the relationship between the counter electromotive force and the magnet thickness Tm shown in FIG. 5 is plotted on the graph of FIG. 8, it becomes clear that the differential magnetic flux density, which is the difference between the magnetic flux density at both ends P and that at a center Q of the stator main magnetic pole in the axial direction, is proportional to the counter electromotive force, and the maximum differential magnetic flux density is distributed within a range of 0.75 T to 0.85 T.

FIG. 9 shows vibration characteristics of the stepping motors of the first embodiment and the prior art when the motors are driven by a full step excitation. In FIG. 9, the horizontal axis represents the rotational speed of the motors, and the vertical axis represents vibration amount of the motor case in the radial direction. The effect of the motor of the present invention is found as the vibration amount in a range from 100 r/min. that is a pull-out point from a resonant area to 450 r/min. The vibration reduction effect of a range of 3G to 4G is found in the two-phase four-pole motor of the first embodiment and that of 1G to 3G is found in the two-phase eight-pole motor of the first embodiment.

FIG. 10 shows a relationship between a rotor core 21 and a stator core 1B in a two-phase eight-pole motor, and FIG. 11 shows a relationship between a rotor core 21 and a stator core in a three-phase three-pole motor. Although these motors are different in the number of the main magnetic poles from the above-mentioned two-phase four-pole motor, the equivalent magnetic circuits are formed, and therefore the similar effects are acquired.

Second Embodiment

A basic structure of a stepping motor of the second embodiment is common to the structure of the first embodiment shown in FIGS. 1, 2A and 2B.

In the stepping motor of the second embodiment, the air gap between the outer surface of the small rotor teeth 20a of the rotor cores 21 and 22 and the inner surface of the small stator teeth 11a of the tip of the main magnetic pole 11 of the stator 1 falls within a range of 0.06 mm to 0.08 mm in the above-mentioned structure.

Since the air gap increases by 20% to 60% as compared with the conventional popular HB type stepping motor, the roundness requirement is eased. Therefore, the surface treatment for the faced surfaces of the rotor cores 21 and 22 and the stator 1 becomes unnecessary, which can reduce the processing cost of a motor.

However, the enlargement of the air gap lowers the torque in general. In order not to lower the torque, the stepping motor of the second embodiment adopts the special structure with two sets of rotor units as mentioned above.

Next, the reason why the stepping motor of the second embodiment produces a torque equal to or larger than the torque of the conventional stepping motor will be described with introducing a magnetic field analysis and an evaluation formula.

A conventional stepping motor as a comparison example includes an eight-pole stator whose inner diameter of small stator teeth is 26 mm shown in FIG. 12C and a rotor with a single rotor unit shown in FIG. 12F. The air gap is 0.05 mm and the magnet is made from neodymium and its residual magnetic flux density is 1.05 T. This conventional motor is referred to as a motor type A.

On the other hand, the stepping motors of the second embodiment having a rotor with two sets of rotor units shown in FIG. 12G are referred to as motor types B and C. A motor type D is a comparison example that is not included in the second embodiment. In The motor types B, C, and D, a magnet is made from ferrite and its residual magnetic flux density is 0.4 T, and the air gap is 0.07 mm. The motor type B includes a four-pole stator whose inner diameter of small stator teeth is 26 mm shown in FIG. 12A, the motor type C includes a four-pole stator whose inner diameter of small stator teeth is 27.5 mm shown in FIG. 12D, and the motor type D includes a four-pole stator whose inner diameter of small stator teeth is 29 mm shown in FIG. 12E. The details of the respective motor types are shown in the following table 1.

TABLE 1

| Motor type | Number of main magnetic poles | Number of small stator teeth | Diameter of tips of small stator teeth D [mm] | Air gap (mm) | Material of magnet |
|---|---|---|---|---|---|
| A | 8 | 6 | 26 | 0.05 | Neodymium |
| B | 4 | 11 | 26 | 0.07 | Ferrite |
| C | 4 | 11 | 27.5 | 0.07 | Ferrite |
| D | 4 | 11 | 29 | 0.07 | Ferrite |

An evaluation formula is created to compare characteristics due to the difference in motor structure. The formula is used to evaluate a motor torque based on an analysis result of the counter electromotive force generated by one turn of the winding and an effective area of the winding portion under a condition where a winding temperature rise becomes constant. A torque $\tau_1$ for one phase is expressed by an equation (3) using a counter electromotive force e, electric current $i_1$, and angular velocity $\omega$.

$$\tau_1 \omega = e i_1 \quad (3)$$

Assuming that the number of turns is $n_1$ and the counter electromotive force for one turn is $e_1$, e is expressed by an equation (4) and it is converted to an equation (5).

$$e = e_1 n_1 \quad (4)$$

$$\tau_1 \omega = e_1 n_1 i_1 \quad (5)$$

A cross-sectional area $S_1$ of one winding is expressed by an equation (6) where $S_C$ is the cross-sectional area of all the windings, a space factor is $f_S$, and the number of phase is m.

$$S_1 = \frac{f_S S_C}{2 m n_1} \quad (6)$$

Winding resistance $R_1$ of one phase is expressed by an equation (7) where $l_1$ is an average length of one winding and $\rho$ is specific resistance of a winding. Here, since m, $\rho$, $l_1$, and $f_S$ are constants, they are replaced by a single constant $k_r$.

$$R_1 = \frac{\rho n_1 l_1}{S_1} = \rho n_1 l_1 \times \frac{2 m n_1}{f_S S_C} = \frac{2 m \rho l_1}{f_S} \times \frac{n_1^2}{S_C} \quad (7)$$

$$= k_r \times \frac{n_1^2}{S_C}$$

Copper loss $W_1$ is expressed by an equation (8), and electric current $i_1$ is expressed by an equation (9).

$$W_1 = i_1^2 R_1 \quad (8)$$

$$i_1 = \sqrt{\frac{W_1}{R_1}} \quad (9)$$

Assuming that copper loss $W_1$ is constant, substitution of the equation (7) into the equation (9) yields an equation (10).

$$i_1 = \sqrt{\frac{W_1 S_C}{k_r n_1^2}} = \sqrt{\frac{W_1}{k_r}} \times \sqrt{\frac{S_C}{n_1}} \quad (10)$$

If it is assumed that $$k_i = \sqrt{\frac{W_1}{k_r}}, \quad (11)$$

the electric current $i_1$ is expressed by an equation (12).

$$i_1 = k_i \times \frac{\sqrt{S_c}}{n_1} \quad (12)$$

Substituting the equation (12) into the equation (5) yields an equation (13).

$$\tau_1 \omega = k_i e_1 \sqrt{S_C} \quad (13)$$

Therefore, the amount of the torque $\tau_1$ can be determined by multiplying the counter electromotive force $e_1$ of one winding by the square root of the cross-sectional area $S_C$ of all the windings under the condition where a heating value of a winding is constant.

The following table 2 shows the result obtained by multiplying the analysis result of the counter electromotive force by one turn of each motor by the square root of the area that can be occupied by the winding. The torque ratio of the motor type B of the present invention is 1.52 times as compared with the conventional eight-pole motor type A. The torque ratio of the motor type C of the present invention is 1.73 times and that of the motor type D is 1.95 times. As a result, the motor torque sharply increases as compared with the motor type A in any of the motor types B, C, and D even if the air gap is enlarged to 0.07 mm.

TABLE 2

| Motor type | P: Counter electromotive force by one turn [$V_{PP}$ at 500 r/min] | Q: Slot area for winding [mm$^2$] | P × $\sqrt{Q}$ | Ratio to conventional motor |
|---|---|---|---|---|
| A | 0.145 | 23.45 | 0.702 | 1 |
| B | 0.237 | 20.32 | 1.068 | 1.52 |
| C | 0.280 | 19.00 | 1.215 | 1.73 |
| D | 0.325 | 17.84 | 1.368 | 1.95 |

When the torque equivalent to the conventional motor is sufficient, the air gap between the outer surface of the small rotor teeth of the rotor and the inner surface of the tip of the main magnetic poles of the stator can be enlarged, which further eases the roundness requirement, enabling the process easier.

In order to reduce vibration, it is necessary to reduce a displacement of the small stator teeth formed on a tip of a jutting section of the main magnetic pole of the stator. And therefore, the stepping motor of the second embodiment satisfies L/W<2.9 and 95 degrees<θ<120 degrees where L is a length of the tip arc of the jutting section 11c of the stator main magnetic pole 11, W is a width of a winding mounting section 11b of the main magnetic pole 11, θ is an angle formed between the winding mounting section 11b and the jutting section 11c of the main magnetic pole 11. See FIG. 12B that is enlarged view of the surrounded portion by dotted lines in FIG. 12A.

FIG. 13 shows an analyzed result about variations of a motor torque, a cogging torque and a radial attraction force due to the change of the air gap in a range of 0.05 mm to 0.08 mm based on the motor type B of the second embodiment. As the air gap is increasing from 0.05 mm, the torque 55 and the attraction force 56 decreases in almost the same gradient. On the other hand, it became clear that the cogging torque 57 decreases in about twice gradient.

The conventional eight-pole motor is the motor type A whose air gap is 0.05 mm. The torque characteristic of the motor type A is 1/1.52 (about 65%) of the motor type B and it is plotted in FIG. 13 as the mark 58. If the torque equivalent to the motor type A is sufficient, the air gap of the motor type B can be enlarged to 0.08 mm.

The cogging torque 57 of the motor type B that causes vibration is the same as that of the conventional motor type A when the air gap is 0.05 mm. However, when the air gap is 0.07 mm in the motor type B, the cogging torque can be reduced to about 60%. As a result, the air gap between the outer surface of the small rotor teeth of the rotor core and the inner surface of the tip of the main magnetic poles of the stator can be selected from a range of 0.06 mm to 0.08 mm, and a characteristic improvement can also be attained.

In the stepping motor of the second embodiment, since cores of the stator and the rotor are automatically stacked in a press process, a polishing process for the outer surface of the rotor and a honing process for the inner surface of the stator become unnecessary, which reduce a manufacturing cost. In addition, since the process to generate a burr becomes unnecessary, a cumbersome process to avoid dispersion of a burr can be also omitted, which can improve reliability.

FIG. 14 shows an analyzed result about a radial displacement of a small tooth 11x that is the furthest from the winding mounting section 11b in the radial direction among the small teeth on the tip of the stator main magnetic pole 11 shown in FIG. 12A when the attraction force is applied thereto. Curves in FIG. 14 represent relationships between a radial force applied to the small tooth 11x and a radial displacement of the small tooth. The curve 63 corresponds to the conventional motor type A, the curve 62 corresponds to the motor type B of the second embodiment, and the curve 61 corresponds to the motor type D of the comparison example.

A distance Z from the winding mounting section 11b to the furthest small tooth 11x is calculated by (L−W)/2 where L is the arc width of the small stator teeth and W is the width of the winding mounting section as shown in FIG. 12B. The distance Z is 2.98 mm in the conventional motor type A, Z=5.3 mm in the motor type B, Z=5.7 mm in the motor type C, and Z=6.25 mm in the motor type D. Since the distance Z varies according to the motor size, it is not suitable to a parameter. Instead of this, the ratio L/W is used. The value of the ratio L/W is 2.99 in the motor type A, L/W=2.77 in the motor type B, L/W=2.84 in the motor type C, and L/W=3.08 in the motor type D.

The angle θ formed between the winding mounting section 11b and the jutting section 11c extended therefrom satisfies 95 degrees<θ<120 degrees. If the angle θ is smaller than 95 degrees, the workability of winding worsens and a winding space factor also decreases. If the angle θ is larger than 120 degrees, the width of the winding mounting section 11c becomes too small or the winding space factor decreases. Therefore, it is preferable that the angle θ satisfies 95 degrees<θ<120 degrees.

The displacement when the load of 3N is applied to the furthest small tooth 11x is 0.14 μm in the motor type A, 0.46 μm in the motor type B, and 0.78 μm in the motor type C. The displacement becomes gradually larger. In the conventional motor structure, this attraction force gives a direct effect on vibration during motor rotation. On the other hand, since there are no imbalance forces in the motor structure of the present invention as mentioned above, the rotation axis 4 does not vibrate. However, the motor of the present invention vibrates when the stator itself vibrates directly.

FIG. 15 shows a measurement result of the vibration characteristics when a motor is driven by a micro step excitation. In FIG. 15, a curve 66 corresponds to the conventional motor type A, curves 67 and 65 correspond to the motor types B and D. FIG. 15 shows that the motor type B generates the lowest vibration when the pulse number is less than 2500 PPS. The motor types A and B are equivalent in the high pulse region. However, the motor type D generates larger vibration among the entire pulse region. The cause is the large displacement of the small tooth furthest from the main magnetic pole in radial direction due to the radial attraction force.

In order to reduce the vibration, it is necessary to limit the distance Z to the furthest small tooth from the main magnetic pole within a certain range. On the other hand, if the distance Z is too small, the number of small stator teeth decreases, which reduces the torque. Further, it decreases a winding area of a slot and gives an effect to the motor torque. In the motor structure of the second embodiment, the value of L/W is smaller than 2.9 and the root angle θ (see FIG. 12B) satisfies 95 degrees<θ<120 degrees in consideration of the vibration characteristics.

Although the second embodiment of the present invention has been described as the two-phase stepping motor in the above description, it can be applied to a three-phase stepping motor in the same manner.

The basic techniques of the respective components of the present invention are established. When the techniques are applied to a two-phase or three-phase stepping motor, a remarkable characteristic improvement can be achieved and the cost can be reduced. Since the stepping motor of the present invention can reduce vibration and noise with satisfying cost reduction that is the absolute condition for a stepping motor used for OA equipment treating images, such as a facsimile, an ink-jet printer, a laser beam printer, or a copy machine, it can be widely used as the optimum driving device for OA equipment.

What is claimed is:

1. A stepping motor comprising:
   a stator having a plurality of main magnetic poles each of which has a plurality of small stator teeth formed on a tip of a jutting section thereof, a core-back portion that connects outer portions of said main magnetic poles as a single piece, and a plurality of windings wound around the respective main magnetic poles; and
   two sets of rotor units that are arranged in an axial direction and face said stator with an air gap therebetween,
   wherein each rotor unit consists of two rotor cores that are separated in the axial direction and a magnet that is sandwiched by said two rotor cores and magnetized in the axial direction, each of said rotor cores has a plurality of small rotor teeth around its outer surface,
   wherein said two rotor cores of each rotor unit are deviated by ½ pitch of said small rotor teeth in the circumferential direction, and said two rotor units are arranged to make the magnetic polarities of said small rotor teeth of the adjacent two rotor cores identical, and
   wherein the relationship between a magnet thickness Tm and a rotor core thickness Tc satisfies $0.25 \leq Tm/Tc \leq 0.45$,
   wherein said magnets are ferrite magnet and the maximum magnetic flux density of said small rotor teeth in a radial direction component falls within a range of 1.4 T to 1.7 T, and
   wherein said magnets are ferrite magnet and the maximum differential magnetic flux density, which is the maximum difference between the magnetic flux density at both ends and that at a center of said stator main magnetic pole in the axial direction, falls within a range of 0.75 T to 0.85 T.

2. The stepping motor according to claim 1, wherein the number of said main magnetic poles is 4 or 8 and said windings are two-phase windings.

3. The stepping motor according to claim 1, wherein the number of said main magnetic poles is 3 or 6 and said windings are three-phase windings.

* * * * *